(12) United States Patent
O'Brien et al.

(10) Patent No.: US 7,748,277 B2
(45) Date of Patent: Jul. 6, 2010

(54) HERMETIC CHAMBER WITH ELECTRICAL FEEDTHROUGHS

(75) Inventors: David O'Brien, Norcross, GA (US); Christophe Courcimault, Avondale Estates, GA (US); Liang You, Duluth, GA (US); Yeun-Ho Joung, Suwanee, GA (US); Mark Allen, Atlanta, GA (US)

(73) Assignee: CardioMEMS, Inc., Atlanta, GA (US)

( * ) Notice: Subject to any disclaimer, the term of this patent is extended or adjusted under 35 U.S.C. 154(b) by 0 days.

(21) Appl. No.: 11/582,669

(22) Filed: Oct. 18, 2006

(65) Prior Publication Data

US 2007/0107524 A1 May 17, 2007

Related U.S. Application Data

(60) Provisional application No. 60/728,373, filed on Oct. 19, 2005.

(51) Int. Cl.
*G01L 9/00* (2006.01)
*G01L 9/12* (2006.01)
*G01L 9/06* (2006.01)

(52) U.S. Cl. .............................. 73/723; 73/724; 73/727; 73/756; 600/488

(58) Field of Classification Search ..................
73/862.621–862.68, 777, 780, 715–722,
73/756, 723–727, 431; 438/50–53; 600/486,
600/488, 300, 301; 128/899
See application file for complete search history.

(56) References Cited

U.S. PATENT DOCUMENTS

| 4,168,518 | A | * | 9/1979 | Lee ......................... 361/283.1 |
|---|---|---|---|---|
| 4,730,496 | A | * | 3/1988 | Knecht et al. ................. 73/724 |
| 4,773,972 | A | * | 9/1988 | Mikkor ..................... 156/89.15 |
| 5,911,162 | A | * | 6/1999 | Denner ........................ 73/718 |
| 5,974,894 | A | * | 11/1999 | Delatorre ..................... 73/718 |
| 6,855,115 | B2 | * | 2/2005 | Fonseca et al. .............. 600/488 |
| 6,949,807 | B2 | * | 9/2005 | Eskridge et al. ............... 438/51 |
| 7,035,076 | B1 | * | 4/2006 | Stevenson ................... 361/302 |
| 7,147,604 | B1 | * | 12/2006 | Allen et al. ................. 600/549 |
| 7,204,737 | B2 | * | 4/2007 | Ding et al. .................... 445/24 |
| 2003/0136417 | A1 | * | 7/2003 | Fonseca et al. ............. 128/899 |
| 2004/0077117 | A1 | * | 4/2004 | Ding et al. .................... 438/51 |
| 2004/0152229 | A1 | * | 8/2004 | Najafi et al. .................. 438/52 |
| 2005/0187482 | A1 | * | 8/2005 | O'Brien et al. ............. 600/486 |
| 2006/0177956 | A1 | * | 8/2006 | O'Brien et al. ............... 438/50 |
| 2006/0241354 | A1 | * | 10/2006 | Allen ......................... 600/300 |
| 2006/0287602 | A1 | * | 12/2006 | O'Brien et al. ............. 600/486 |

FOREIGN PATENT DOCUMENTS

WO    WO 2004035461 A2 *  4/2004

* cited by examiner

*Primary Examiner*—Harshad Patel
*Assistant Examiner*—Punam Patel
(74) *Attorney, Agent, or Firm*—Ballard Spahr LLP (57) ABSTRACT

An exemplary pressure cavity is disclosed that is durable, stable, and biocompatible and configured in such a way that it constitutes pico to nanoliter-scale volume. The exemplary pressure cavity is hermetically sealed from the exterior environment while maintaining the ability to communicate with other devices. Micromachined, hermetically-sealed sensors are configured to receive power and return information through direct electrical contact with external electronics. The pressure cavity and sensor components disposed therein are hermetically sealed from ambient pressure in order to reduce drift and instability within the sensor. The sensor is designed for harsh and biological environments, e.g., intracorporeal implantation and in vivo use. Additionally, novel manufacturing methods are employed to construct the sensors.

11 Claims, 6 Drawing Sheets

HERMETIC CHAMBER WITH ELECTRICAL FEEDTHROUGHS

CROSS-REFERENCE TO RELATED APPLICATIONS

This application is entitled to the filing date of provisional U.S. Patent Application Ser. No. 60/728,373, filed Oct. 19, 2005.

BACKGROUND

The present invention relates to micromachinable, pico- to nanoliter-volume, hermetic packaging that incorporates reliable electrical feedthroughs, and sensors configured utilizing same, all of which are intended to perform reliably in harsh and biological environments.

Over the past 20 years, advances in the field of microelectronics have enabled realization of microelectromechanical systems (MEMS) and corresponding batch fabrication techniques. These developments have allowed creation of sensors and actuators with micrometer-scale features. With the advent of the above-described capability, heretofore implausible applications for sensors and actuators are now significantly closer to commercial realization.

In parallel, much work has been done in the development of pressure sensors. Pressure sensors are disclosed, for example, in U.S. Pat. No. 6,855,115, issued Feb. 15, 2005; U.S. patent application Ser. No. 10/054,671, filed Jan. 22, 2002; U.S. patent application Ser. No. 10/215,377, filed Aug. 7, 2002; U.S. patent application Ser. No. 10/215,379, filed Aug. 7, 2002; U.S. patent application Ser. No. 10/943,772, filed Sep. 16, 2004; and U.S. patent application Ser. No. 11/157,375, filed Jun. 21, 2005, all of which are incorporated herein by reference.

In particular, absolute pressure sensors, in which the pressure external to the sensor is read with respect to an internal pressure reference, are of interest. The internal pressure reference is a volume within the sensor, sealed, which typically contains a number of moles of gas (the number can also be zero, i.e., the pressure reference can be a vacuum, which can be of interest to reduce temperature sensitivity of the pressure reference as known in the art). The external pressure is then read relative to this constant and known internal pressure reference, resulting in measurement of the external absolute pressure. For stability of the pressure reference and assuming the temperature and volume of the reference are invariant or substantially invariant, it is desirable that the number of moles of fluid inside the reference does not change. One way to achieve this condition is for the reference volume to be hermetic.

The term hermetic is generally defined as meaning "airtight or impervious to air." In reality, however, all materials are, to a greater or lesser extent, permeable, and hence specifications must define acceptable levels of hermeticity. An acceptable level of hermeticity is therefore defined by the accuracy needed in a particular application during the period over which the sensor is used and is not recalibrated. For some applications, a rate of fluid or gas ingress or egress that changes the pressure in the internal reference volume (pressure chamber) by 10 percent of the external pressure being sensed may be acceptable. In other applications, a change of less than 1 percent may be needed. In certain medical applications, an acceptable pressure change in the pressure chamber may be on the order of 1.5 mm Hg/year.

The pressure reference is typically interfaced with a sensing means that can sense deflections of boundaries of the pressure reference when the pressure external to the reference changes. A typical example would be bounding at least one side of the pressure reference with a deflectable diaphragm or plate and measuring the deflection of the diaphragm or plate by use of, among other techniques, a piezoresistive or a capacitance measurement. If the deflection of the diaphragm or plate is sufficiently small, the volume change of the pressure reference does not substantially offset the pressure in the pressure reference.

These approaches may require an electrical feedthrough to the hermetic environment (e.g., to contact electrodes inside the hermetic pressure reference), for connection to outside electronics to buffer or transmit the signal. Alternatively, electronics may be incorporated within the reference cavity, requiring power to be conducted into the hermetic environment. To maintain stability of the pressure reference, these seals should also be hermetic, resulting in the necessity to develop a feedthrough technology for contacts through the cavity walls. As is known in the art, such feedthrough points are typically sites for failure of hermeticity. This problem is further exacerbated when miniaturizing the sensor, since the total volume of material available for hermetic sealing shrinks proportionally and the reliability of the feedthrough is also greatly reduced. In the limit of ultraminiaturized sensors, such as those producible using microelectromechanical systems (MEMS) technology, one of the major challenges to enabling the use of such devices in applications where they are physically connected to other devices has been the creation of reliable hermetic packaging that provides feedthroughs that enable exchange of power and information with external electronics.

Design criteria for ultraminiature packaging that overcomes the aforementioned shortcomings are as follows. The packaging must exhibit long term hermeticity (on the order of the life of the sensor, which in some cases can exceed tens of years). Feedthroughs must be provided through the hermetic package that do not introduce new or unnecessary potential modes of failure. The feedthroughs constitute a necessary material interface, but all other interfaces can and should be eliminated. In other words, the number and area of material interfaces should be minimized to reduce the potential for breach of hermeticity. The materials selected must be compatible with the processes used to fabricate the package as well as sufficiently robust to resist deleterious corrosion and biocompatible to minimize the body's immune response. Finally, the packaging should be amenable to batch fabrication.

In the past, many methods for creating hermetic packages have been proposed. One approach used in the past to create a pressure cavity is anodic bonding to create a silicon-to-glass seal. A borosilicate glass is required for this method. Another technique used to make hermetic packages is eutectic bonding to create a silicon to metal hermetic seal, e.g., Au to Si. Both of these bonding methods used to create the pressure cavity introduce a large area along the perimeter of the material interface of the pressure cavity package which presents opportunity for failure, e.g., through corrosion. These methods for creating the pressure cavity do not minimize the area of the material interface as is desirable. A desirable improvement to the construction of the pressure cavity would minimize the material interface to the hermetic electrical feedthroughs, and, even further, minimize the number and area of material interfaces in those feedthroughs.

Figure 1:
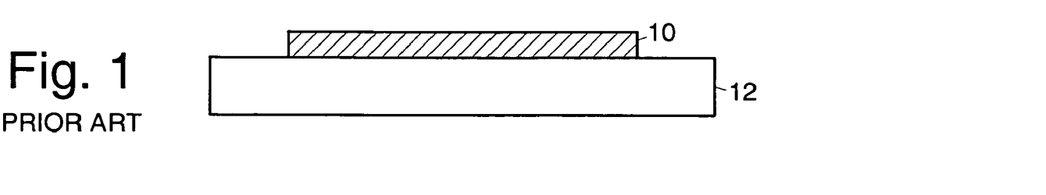
FIGS. 1-4 illustrate steps in manufacturing a PRIOR ART hermetic chamber with electrical.
Figure 2:
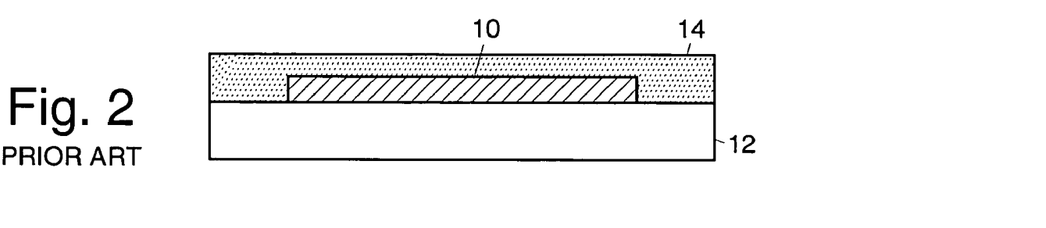
Figure 3:
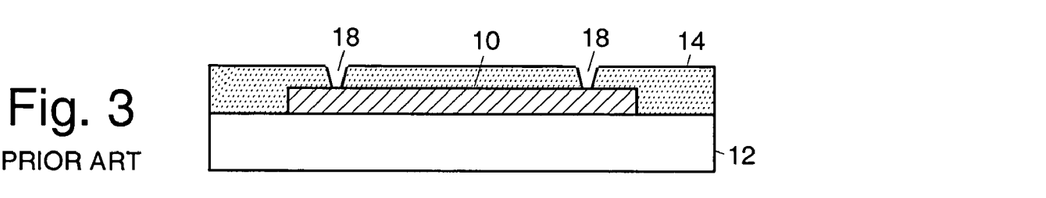
Figure 4:
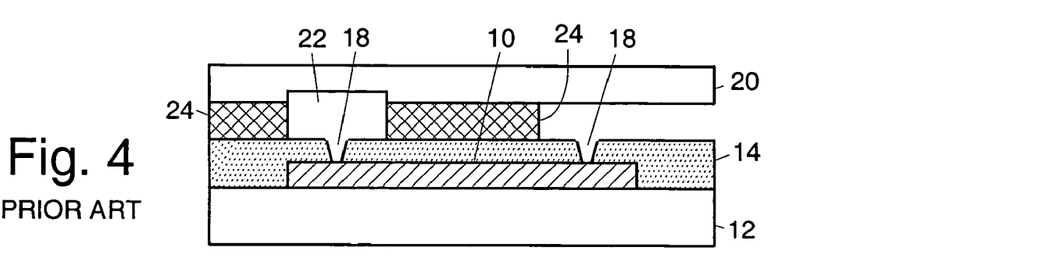
Figure 5:
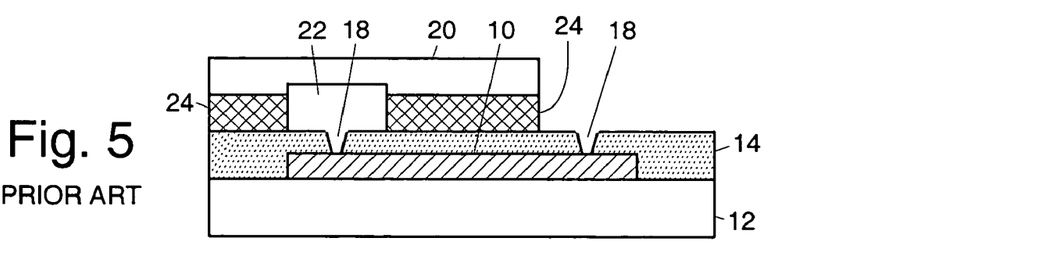
FIG. 5 is a schematic representation of a completed PRIOR ART hermetic chamber with electrical feedthroughs.

Prior attempts to create hermetic feedthroughs also fall short of the above-stated requirements. Many prior art hermetic feedthroughs are too large and not amenable to the required miniaturization for pico to nanoliter volume packaging achievable by MEMS or similar approaches. Furthermore, earlier attempts to create feedthroughs in pico to nanoliter packaging are prone to corrosion because of the materials used in construction or are sufficiently complicated that they introduce more material interfaces than are desired. A representative feedthrough approach, known as a "buried" feedthrough, is illustrated in FIGS. 1-5. One method for creating a buried feedthrough is as follows. A metal 10 is deposited onto substrate 12 in a predefined pattern, as shown in FIG. 1. An insulating layer 14 is deposited on top of the metal layer, as shown in FIG. 2, and this insulating layer 14 is polished to planarize this surface. In FIG. 3 an etchant has been used to expose the metal layer at input and output sites 16, 18 for the feedthroughs. In FIG. 4, another substrate 20 is bonded on top of this structure, forming a hermetic cavity 22. A eutectic bonding method is illustrated, which involves the use of gold deposits 24 interposed between the insulating layer 14 and the upper substrate 20 to bond the upper substrate to the insulating layer. In FIG. 5, the upper substrate 20 is machined to expose the external feedthrough 18. An electrical conductor can now be connected to the external feedthrough 18, whereupon it is conducted through the metal 10 to the internal feedthrough 16 within the hermetically sealed chamber 22.

This prior art buried feedthrough has a number of disadvantages. First, there are numerous material interfaces: an interface 30 between the lower substrate 12 and the metal 10; an interface 32 between the metal 12 and the insulating layer 14, an interface 34 between the insulating layer 14 and the gold 24; and an interface 36 between the gold 24 and the upper substrate 20, all of which create potential paths for infusion into or effusion out of the hermetic chamber 22. The creation of this buried feedthrough also introduces increased processing steps. Further, the insulating layer material is cited as being prone to corrosion in certain environments, e.g., the human body. Corrosion issues may be further exacerbated by the application of electrical bias to metal 10 which may be required in certain applications. Thus prior art hermetic feedthroughs fall short of meeting the constraints outlined above.

Also, many prior art attempts to provide pressure sensors utilize silicon as a substrate material. If the package is implanted in vivo, silicon is not an optimal material choice. Silicon invokes an undesirable immune response over other, more inert materials such as fused silica. If silicon is used, a coating must be applied to ensure biocompatibility. Such a coating increases the package size, thereby decreasing the benefits of miniaturization, and introduces an undesirable additional processing step in the manufacture of the package.

Additionally, prior art devices commonly employ the use of borosilicate glass as part of the pressure cavity. The ions in borosilicate glass constitute an impurity in the glass. The barrier to diffusion of water decreases as the purity of glass decreases. This makes use of impure glass undesirable in such applications.

Thus, a need exists for hermetic pico to nanoliter packaging with electrical feedthroughs for use in biological environments, such packaging being constructed of high-purity materials and having a reduced number and area of material interfaces.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Disclosed are exemplary micromachinable, hermetic, pico to nanoliter-volume pressure cavities and sensors. The pressure cavities utilize high-purity materials and provides reliable electrical feedthroughs. An exemplary pressure cavity is constructed of a ceramic material and is optionally fused together so that there is no interface of material where two substrates have been joined to create a cavity. Furthermore, feedthroughs establishing electrical communication within the cavity are formed in at least one of the substrates. The feedthroughs themselves are configured in such a way that the number and area of material interfaces is minimized. Such feedthroughs constitute the only site for material interface in the sensor, thereby decreasing the number of potential leak sites in, and increasing the reliability of, the hermetic package. Pressure cavities and sensors are manufactured using microelectromechanical systems (MEMS) fabrication techniques, which allow creation of a device that is small, accurate, precise, durable, robust, biocompatible, and insensitive to changes in body chemistry or biology.

The sensor may be incorporated into harsh and biological environments. One example of such an environment is a medical lead or catheter implanted, acutely or chronically, into the human body. The sensor is configured to measure one or more physical properties such as pressure or temperature. Communication between the sensor and another device can be established by, e.g., using wires fixed to bonding pads on the exterior of the sensor packaging that are configured so that they are in electrical contact with the hermetic feedthroughs. As another example, the hermetic electrical feedthrough can have a wire extending from the feedthrough, and contact with the pressure cavity can be accomplished via connection with this wire. Devices in electrical communication with sensors according to the present invention may be either implanted or external to the body. Sensors of this invention are sufficiently small to allow for incorporation into medical leads or catheters that are twelve French or smaller, preferably six French or smaller, without causing abrupt changes in geometry of the lead or catheter, and require minimal power to perform their intended function.

In one embodiment, a wired sensor ascends (i.e., to rise to a higher point, rank, or degree; proceed from an inferior to a superior degree or level) to a hermetic pressure cavity. The pressure cavity comprises a capacitor configured so that the characteristic capacitance value of the capacitor varies in response to a physical property, or changes in a physical property, of a patient. The electrodes of the capacitor are substantially planar and are arranged substantially parallel to and spaced apart from one another. The pressure cavity has at least one deflectable region in mechanical communication with at least one of the capacitor electrodes. Additionally, electrical feedthroughs are formed through the substrate defining the pressure cavity and allow for the sensor to receive power and signals, and return information to either implanted or extracorporeal external electronics.

In another embodiment, a wired sensor comprises a hermetic pressure cavity. The pressure cavity further comprises a Wheatstone bridge configured so that the resistance value of the bridge varies in response to a physical property, or changes in a physical property, of a patient. The pressure cavity has at least one deflectable region in mechanical communication with at least one of the resistors comprising the bridge. Additionally, electrical feedthroughs are formed through the substrate and allow for the sensor to receive power and signals, and return information to external electronics. Only a portion of the Wheatstone bridge be located within the pressure cavity, the other portion being contained within external electronics.

In yet another embodiment, a wired sensor further comprises on-board (i.e., within the sensor package) electronics, comprising a silicon chip bearing electronics. The variable capacitive or resistive element and the on-board electronics can be maintained in separate cavities in electrical communication with one another by hermetic feedthroughs formed through a middle substrate. Feedthroughs establishing electrical communication with the sensor exterior may be configured so that moisture does not affect the electronics over the life of the sensor and, optionally, are also hermetic. This configuration offers the advantage that the feedthroughs to the on-board electronics act as a redundant barrier to any potential breach of the hermeticity of the pressure cavity. Alternatively, the capacitor and on-board electronics can be contained within a single hermetic cavity. This configuration offers the advantage of decreased manufacturing steps, thereby lowering the overall cost to produce the sensor. In either case, hermetically sealed vias, which are themselves optionally hermetic, formed through the substrates comprising the external walls allow for the sensor to receive power and return information to external electronics.

Figure 6:
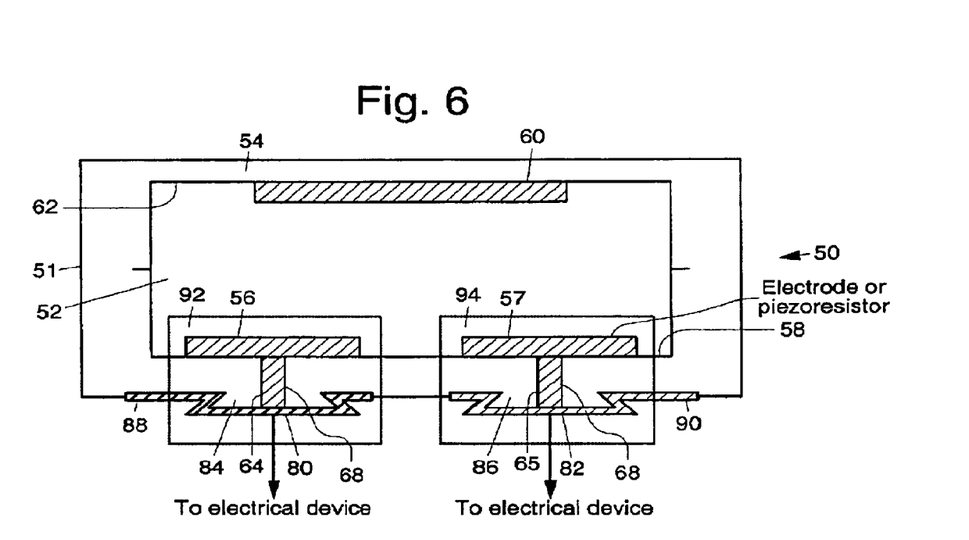
FIG. 6 is a schematic representation of an exemplary hermetic chamber with electrical feedthroughs according to a first embodiment.

Referring to FIG. 6, it illustrates a sensor 50 that includes a pressure cavity body 51 or housing 51 defining an internal pressure chamber 52. The pressure cavity body 51 or housing 51 has a volume of from $10^{-8}$ to $10^{-15}$ meters$^3$. One of the walls defining the pressure cavity 52 comprises a deflectable region 54 configured to deflect under a physiologically relevant range of pressures. In a preferred embodiment, a wall of the pressure cavity body 51 is thinned relative to other walls of the pressure cavity body to form the deflectable region 54. The sensor 50 can be fabricated using micro-machining techniques and is small, accurate, precise, durable, robust, biocompatible, and insensitive to changes in body chemistry or biology. Additionally, the sensor 50 can incorporate radiopaque features to enable fluoroscopic visualization during placement within the body. The sensor 50 is preferably formed using electrically insulating materials, particularly biocompatible ceramics, as substrate materials. Suitable materials are selected from a group comprising glass, fused silica, sapphire, quartz, or silicon. In one embodiment, fused silica is the substrate material.

A capacitor comprises a pair of lower electrodes 56, 57 located on a first wall 58 of the chamber 52. The two lower electrodes 56, 57 are electrically isolated from one another. A third (upper) electrode 60 is disposed on an opposite wall 62 of the pressure cavity 52 in parallel, spaced apart relation to the lower electrodes 56, 57. The upper electrode 60 is mechanically coupled to the deflectable region 54. As ambient pressure increases, the deflectable region 54 moves inward, displacing the upper electrode 60 toward the lower electrodes 56, 57, thereby changing the characteristic capacitance value of the capacitor.

The capacitor configuration depicted in FIG. 6 is one example where the lower capacitor electrode comprises two electrically isolated regions, 56 and 57, although other configurations are possible and should be apparent to one skilled in the art.

The lower portion of the pressure cavity 52 contains electric (conductive) feedthroughs 64, 65 that traverse the hermetic pressure cavity body 51 and are in contact with the electrically isolated electrodes 56, 57. As shown in FIG. 6, electrical contact pads 66, 67 can be formed on the opposite side of the first wall 58 of the pressure cavity body 51 from the electrodes 56, 57 and metal can be deposited in the feedthrough passages 64, 65 to extend to the interior of the housing, thereby providing for electrical communication between the external electronics and the interior of the sensor 50. In a preferred embodiment, the metal-fused silica interface between feedthrough exteriors 80, 82 and the exterior surface of the pressure cavity body 51 is hermetic. Metals that are suitable for use in construction of the feedthroughs are limited only by considerations specific to an application. Such considerations include, but are not limited to, corrosion, mechanical strength and, when used in vivo, biocompatibility. For in vivo use, metals selected from the group comprising Au, Ag, Pt, Ni, Nb, Ti, W, Ta, Cr, Ir and alloys there of (e.g., Pt/Ir) are examples of metals that may be utilized.

The feedthrough structure comprises a metal layer on the exterior of the package (the feedthrough exteriors 80, 82) that is deposited on the exterior of the pressure cavity body 51. Before steps comprising assembly and fusion to form the pressure cavity 52 (described later), one substrate comprising the pressure cavity body 51 is configured to provide raised portions 84, 86 surrounding the feedthrough passages 64, 65 via, e.g., machining (chemical, ultrasonic or conventional), etching (wet or dry) or any combination of machining and etching. The raised portions 84, 86 have walls defining its perimeter that are either substantially perpendicular to the substrate or are inclined towards the exterior of the sensor body 51. Then, a metal layer is deposited via, e.g., low pressure plasma spray (LPPS), electrodeposition, vacuum deposition. The metal is deposited at a higher temperature than the intended working temperature of the feedthrough and, upon cooling, the difference in the properties of thermal expansion between the metal comprising the feedthrough exterior 80, 82 and the raised portions 84, 86 of the ceramic substrate will cause a compressive force on the raised portions 84, 86 of the substrate. The length of the walls of defining the perimeter of the raised portions 84, 86 can be increased which, in turn, increases the compressive force exerted on the raised portions 84, 86 upon finalization of the feedthrough. Then, metal conductor lines or electrodes 56, 57 can be formed on the side of the substrate that will form a first wall of the pressure cavity 52. The feedthrough passage 64, 65 can either be partially or completely filled with metal. Also, the feedthrough exteriors 80, 82 can be configured to extend onto the exterior surface of the pressure cavity body 51 to provide a separate means 88, 90 to connect external electronics.

The pressure cavity 52 is hermetic because of the following reasons. First, the pressure cavity body 51 is formed of a hermetic material and is a unitary structure, meaning there are no seams or bi-material joints that can form a potential path for gas or fluid intrusion into the pressure chamber other than the electric feedthroughs 92, 94, which themselves are hermetic. One reason for the hermeticity of the feedthroughs 92, 94 is that the feedthrough exteriors 80, 82 are hermetically disposed onto the raised portions 84, 86 of the substrate surrounding the feedthrough passages 64, 65. Furthermore, a mechanical compressive seal is formed between the feedthrough exteriors 80, 82 and the raised portions 84, 86 of the substrate that further decreases the ability of fluid or gas to enter the pressure cavity 52 through this bi-material interface. Optionally, the feedthrough passages 64, 65 are themselves filled with a material 68 capable of hermetic sealing and the interface between the material 68 and the material defining the feedthrough passages 64, 65 is also hermetic. Thus gas or fluid would have to pass through or around the feedthrough exteriors 80, 82 into the feedthrough passage 64, 65 before it could enter the pressure chamber and compromise the integrity thereof. Optionally, any fluid or gas would also have to pass through or around the metal inside the feedthrough passage 56, 57 and/or through or around electrodes 56, 57 before it could enter the pressure chamber and compromise the integrity thereof. Both the metal inside the feedthrough passage and the electrodes 56, 57 are optionally hermetically sealed against the substrate material. Finally, the feedthroughs 64, 65 are small, thereby minimizing the area of interface. Such feedthrough passages 64, 65 in the pressure cavity body 51 have areas ranging from $10^{-6}$ to $10^{-9}$ square meters.

Fabrication of the sensor 50 depicted in FIG. 6 is based on the micromachining of two substrates that are subsequently brought into contact and cut into individual sensors. The manufacturing process described herein and illustrated in FIGS. 7-24 comprises a series of etching, deposition and patterning processes to create depressions and electrodes on the surfaces of the substrates. More specifically, a first substrate is subjected to a series of processes to create local depressions of known depth, feedthrough passages, raised portions surrounding the feedthrough passages and to deposit and pattern thin film electrode(s) at the bottom of the depressions. Next, a second substrate is subjected to similar processing as the first substrate to create complementing electrode(s) whose overall footprint and in-plane position correspond to the footprint and in-plane position(s) of the electrode(s) on the first substrate. Creation of depressions in the surface of the second substrate is optional and depends on the desired final configuration of the sensor. The configuration of the electrodes and the through-holes can be altered to provide for a variety of configurations, such modifications providing manufacturing and/or performance advantages. The two substrates are then brought into intimate contact with the electrodes facing one another. The substrates form a temporary bond due to the presence of Van der Waals forces. The electrodes on opposing substrates are separated by a gap of known value, i.e., the difference between the sum of the depths of the recessed region and the sum of the thicknesses of the electrodes. A laser is then used to excise the sensor in its final overall dimensions from the two-substrate stack.

The laser cutting operation fuses the substrates, hermetically sealing the sensor, and trapping air, any other desirable gas, or vacuum in the hermetic cavity of the sensor. In one example, a $CO_2$ laser operating at a peak wavelength of ten microns is used to hermetically seal and to reduce the sensor to its final size. The laser energy is confined to a precise heat effect zone where the substrates are fused, eliminating any material interface between the original substrates.

The resulting hermetic package presents electrical feedthroughs created in the sensor body that allow for communication between components inside the hermetically sealed sensor and external electrical components. The feedthroughs are small, thereby minimizing the area of interface. Such feedthroughs interface with the substrate at areas ranging from $10^{-6}$ to $10^{-9}$ square meters.

The manufacturing of the sensor depicted in FIG. 6 from the substrate (wafer) level to the final device is described in detail below. For clarity, the manufacture of the sensor is described on a single-sensor basis, although multiple sensors are created simultaneously on the substrate in a batch process to increase manufacturing efficiency.

The lower substrate is processed to create a recessed region in its surface, feedthrough passages, raised portions surrounding the feedthrough passages and thin film electrodes at the bottom surface of each recessed region. Creation of a recessed region with known geometry comprises the steps of (i) depositing and patterning a mask at the surface of the wafer, (ii) etching the wafer material through openings in the mask, and (iii) removal of the mask.

Figure 7:
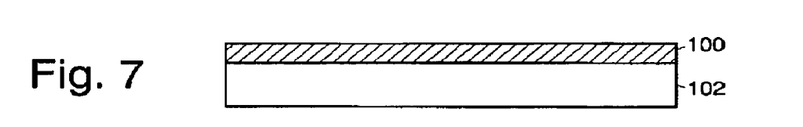
FIGS. 7-24 illustrate exemplary steps in manufacturing the hermetic chamber shown in FIG. 6.

One method for creating the desired recessed region is depicted in FIGS. 7-20 and described as follows. Referring to FIG. 7, a thin metallic film 100 (or thin film layer 100) is deposited at the surface of a fused silica substrate 102 using a physical vapor deposition system (e.g., an electron-beam evaporator, filament evaporator, or plasma assisted sputterer). This thin film layer 100 will form a mask used to create a recessed region in the upper surface of the substrate 102. The nature and thickness of the metal layer 100 are chosen so that the mask is not altered or destroyed by a glass etchant. For the purpose of illustration, Cr/Au or Cr/Ni are examples of suitable mask materials. A representative Cr/Au mask is 100-200 Angstroms of chromium and 1000-3000 Angstroms of gold.

Figure 8:
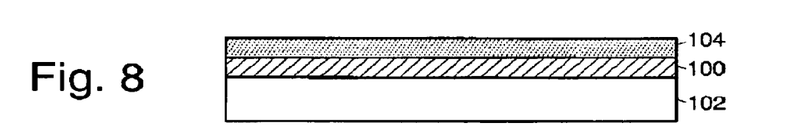
Figure 9:
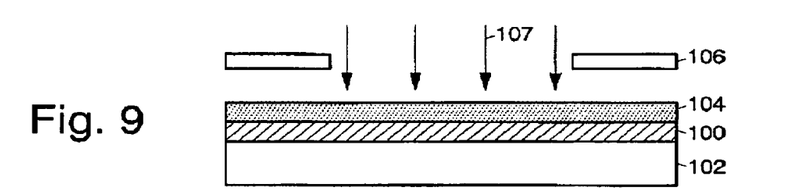
Figure 10:
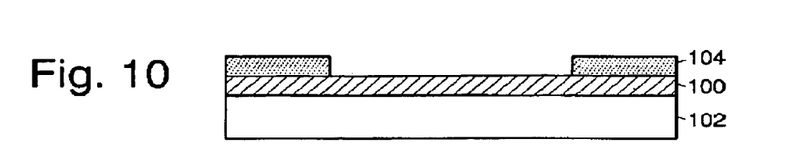

As can be seen in FIG. 8, a layer 104 of photoresist is formed atop the thin metal film 100 and substrate 102. Then, as shown in FIG. 9, a mask 106 having a rectangular opening is positioned over the photoresist layer 104, and ultraviolet light, indicated by the arrows 107, is directed through the mask 106 onto the exposed portions of the photoresist layer 104. The exposed photoresist defining the body of the rectangular region is removed via the appropriate etchants, as illustrated in FIG. 10.

Figure 11:
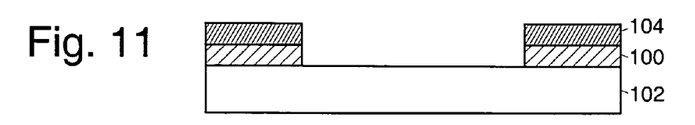
Figure 12:
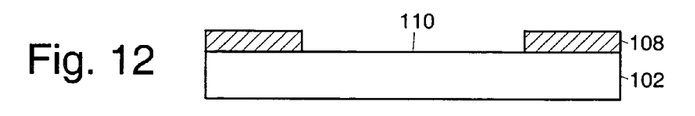

Referring to FIG. 11, etchants are used to etch away the rectangular portion of the thin metallic film 100 exposed through the patterned photoresist layer 104. When the remaining photoresist material is removed, such as by using an appropriate organic solvent, the substrate 102 is left with a metallic mask 108 defining a rectangle 110, as illustrated in FIG. 12.

Figure 13:
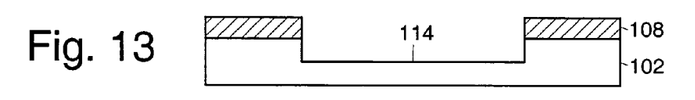
Figure 14:
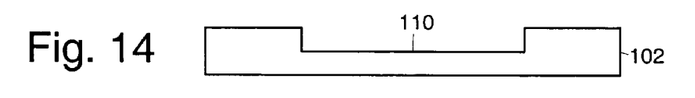

A glass etchant is now used to etch the portion of the upper surface of the substrate 102 that is exposed through the mask 108. To accomplish this, the substrate 102 is placed in a fixture that prevents the etchant from contacting the un-masked back side of the substrate 102 and is then submerged in a solution containing hydro-fluoric acid, resulting in etching of the masked substrate 102 only where the fused silica is exposed. The substrate 102 is removed from the acid when the substrate 102 has been etched to the desired depth, usually on the order of 1-3 micrometers. The resulting etched substrate 102 with rectangular recessed region 114 is shown in FIG. 13. Then, as shown in FIG. 14, the mask 108 is removed from the etched substrate 102 using proper selective etchants and solvents.

Figure 141:
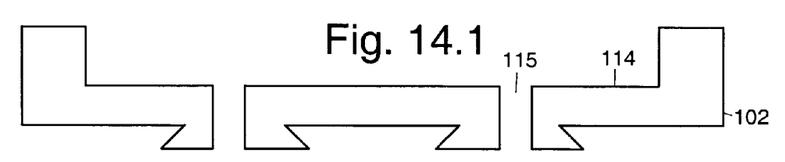
Figure 142:
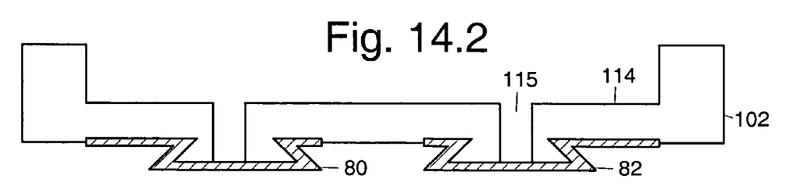

Subsequently, as is shown in FIG. 14.1, feedthrough passages 115 are created through the thickness of the substrate 102 and inside of the previously created recessed region 114. The passages are created via machining (e.g., laser, ultrasonic or conventional), etching or a combination of both. Then, the side of the substrate 102 opposite that containing the recessed region 114 is subjected to further machining or etching to selectively remove material, thereby creating raised areas surrounding the feedthrough passages 115 which have sidewalls that are either perpendicular to the surface of the substrate 102 or inclined away from the uppermost surface of the feedthrough passage 115. As is shown in FIG. 14.2, metal is then deposited via known methods to form the feedthrough exteriors 80, 82. During this step, the substrate material is maintained at an elevated temperature that is not so high as to lead to any loss of function of the desired final structure. The metal is deposited at an elevated temperature as well. The metal is either deposited selectively with a mask or in a non-localized manner and the unwanted material is etched away. The substrate 102 possessing the deposited material is then, optionally, cooled in a controlled manner or subjected to an annealing step immediately after the metal deposition and before any necessary etching of unwanted material.

Figure 15:
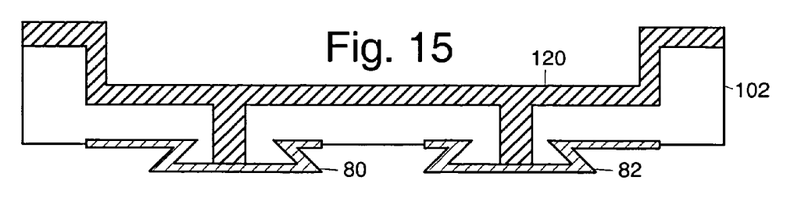

The etched substrate 102 is now primed for creation of electrodes at the bottom of the recessed region 114. As is shown in FIG. 15, a thin film metal layer 56, 57 is deposited onto the upper surface of the etched substrate 102 and onto the surface of the feedthrough passage 115. For the purposes of illustration, this thin film metal layer 56, 57 can be composed of elemental chromium and gold. A representative Cr/Au layer is a 100-200 Angstrom seed layer of chromium and 1000-3000 Angstroms of gold. The thin film layer 56, 57 can also utilize a Ti seed layer and either a Ni or Pt secondary layer. This layer fills the feedthrough passage 115. The thickness of this layer is carefully controlled so that, in this embodiment, the metal layer 56, 57 does not protrude above the level of the original surface of the patterned side of the substrate 102.

Figure 16:
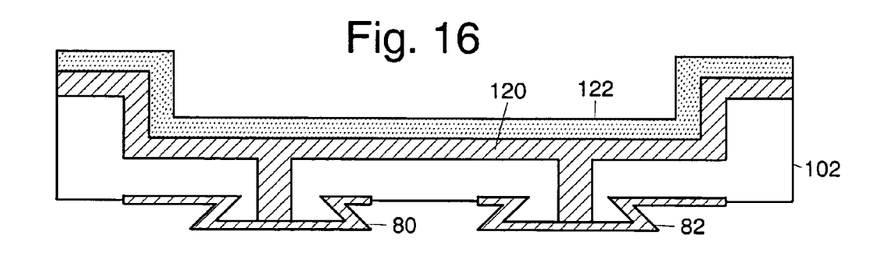
Figure 17:
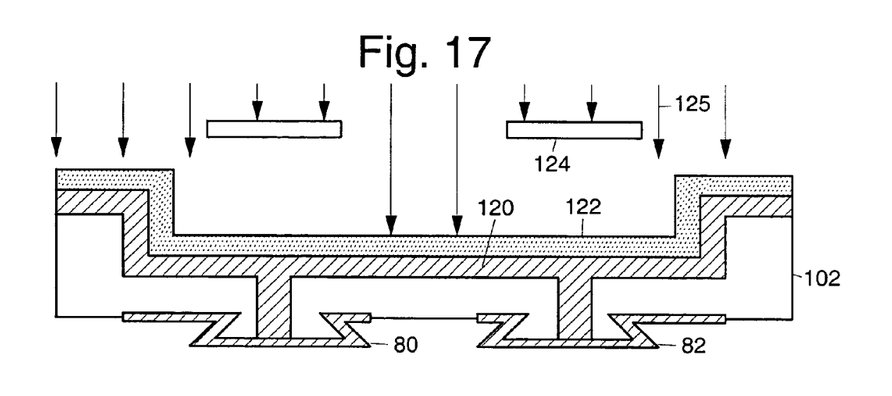
Figure 18:
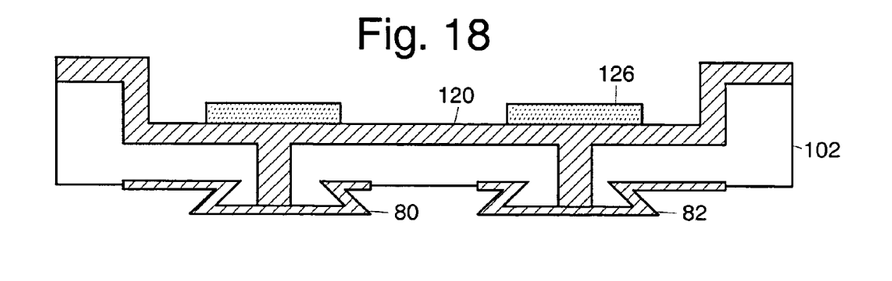

Referring to FIG. 16, a layer of photoresist 122 is deposited over the surface of the metal layer 56, 57. A mask 124 is positioned over the photoresist layer 122, and ultraviolet light, indicated by the arrows 125, is directed onto the exposed portions of the photoresist layer 122, as shown in FIG. 17. Then, as illustrated in FIG. 18, the exposed photoresist layer 122 is removed, leaving a mask 126 of photoresist material formed on the upper surface of the metal layer 56, 57.

Figure 19:
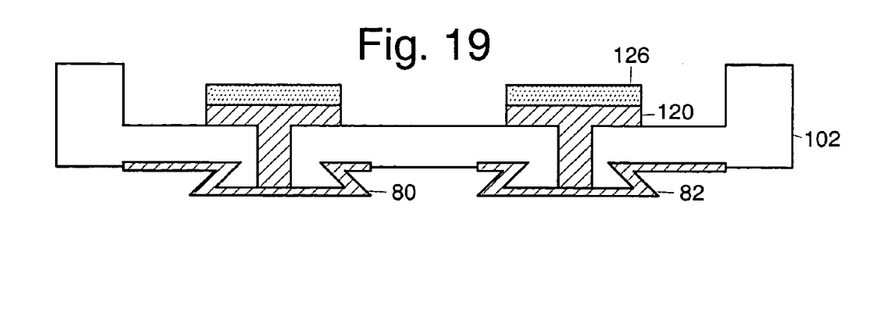

Next, the portions of the metal layer 56, 57 exposed through the mask 126 are etched away, as illustrated in FIG. 19. In this instance, the patterns defined by the remaining photoresist layer 126 represent two side-by-side rectangles whose in-plane, overall foot print is smaller than that of the recessed region 114. The rectangles are a few micrometers to tens of micrometers apart and maintain at least a few micrometers wide border separating the rectangles from the perimeter of a rectangular trench 114 comprising the recessed region 114. Subsequently, the photoresist layer (mask) 126 is removed with appropriate organic solvents.

Figure 20:
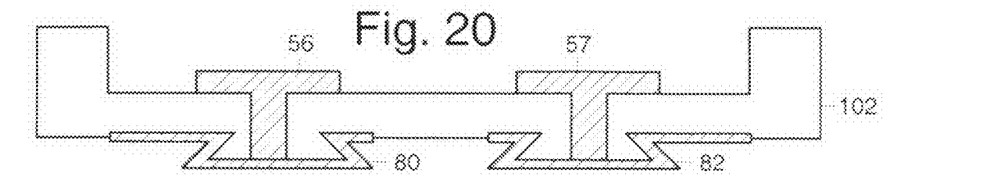

At this point, as depicted in FIG. 20, the etched lower substrate 102 is patterned with the rectangular trench 114 (recessed region 114) etched into its upper surface, and the base of the rectangular trench 114 contains side-by-side, spaced apart metal electrodes 56, 57 of known thickness. The difference between the height of the upper surface of either electrode, H1, and depth D1 of the trench 114 created in the lower substrate 102, is substantially constant (excepting for inherent variations in the substrate 102 and patterned metal), and these dimensions are known with great precision, i.e. fractions of micrometers. Also, hermetic compressive feedthroughs exist through the provision of compressive feedthrough exteriors, filling the feedthrough passage 115 with metal, and placing the electrodes in contact with the compressive feedthroughs via the metal in the feedthrough passages 115.

Figure 21:
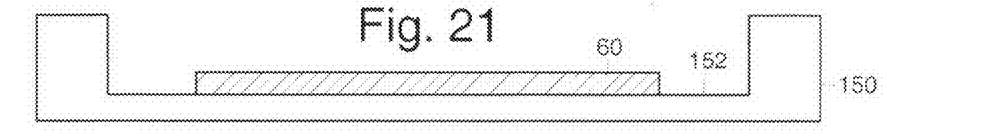

Referring now to FIG. 21, an upper substrate 150 is micromachined using the same sequence of steps described above to create a rectangular trench 152 in the fused silica, and the electrode 60 is created using the same photolithographic process as those described for the lower substrate 102. The only change to the preparation of the electrode 60 in the upper substrate 150 is in the pattern transferred to the second layer of photoresist, i.e. the photoresist layer that serves as a mask for creating the metal electrode. On this substrate 150, one continuous rectangle is patterned that maintains a border at least one micrometer thick separating the electrode 60 from the perimeter of the rectangular trench 152.

As an optional preparatory step for the upper substrate 150, a blanket etch can be performed on the back side using hydrofluoric acid or any other suitable etchant to form the trench 152 (or recess 152) such that overall thickness of the substrate 150 is reduced to a known thickness that lies in the range of 30-100 micrometers. This step serves to increase sensitivity of the deflectable region of the pressure cavity body 51 (FIG. 6). Alternatively, the upper substrate can have an initial thickness in this range, which obviates the need for the above-described step.

Figure 22:
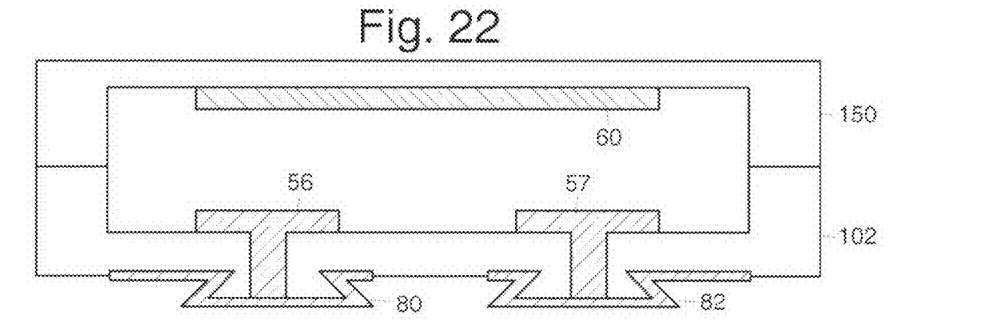
Figure 23:
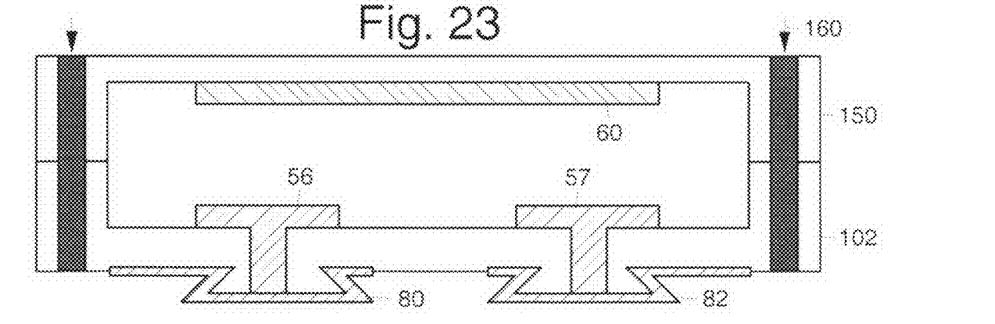
Figure 24:
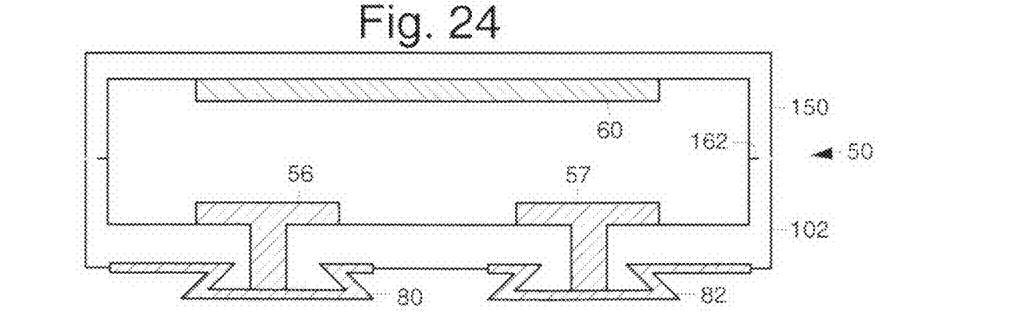

The substrates 102, 150 are then aligned, subjected to bonding, and reduced to the final overall dimension of the sensor shown in FIG. 6 according to the following description. Both the upper and lower substrates 102, 150 are prepared for assembly, e.g., by cleaning. The patterned surfaces of the substrates 102, 150 are faced and aligned so that the corresponding rectangular trenches 114, 152 created in each substrate are positioned directly on top of one another. The two substrates 102, 150 are brought together and placed in intimate physical contact, as shown in FIG. 22. A temporary bond is formed because of Van der Waals forces existing between the two substrates. As previously described, a gap is maintained between the electrodes 56, 57 and the electrode 60 where the distance between the electrodes 56, 57, 60 is precisely known. Referring to FIG. 23, using a $CO_2$ laser, for example, indicated by the arrows 160, the sensor is reduced to its final dimensions. The laser cutting process also seamlessly fuses the upper and lower substrates 102, 150. The result of the above steps is depicted in FIG. 24. Thus, the rectangular electrodes created combine to form a complete device that displays the electrical attributes of a parallel plate capacitor.

With further reference to FIG. 24, the power of the $CO_2$ laser is controlled such that heat damage to the internal components is avoided. Consequently it is possible that some vestige of a seam 162 may remain between the upper and lower substrates 102, 150. So long as the outer periphery of the pressure cavity body 51 is completely fused, the interior chamber 52 will be hermetic.

It is a further aspect, a hermetic sensor is provided that incorporates a pressure cavity and additional electrical components that incorporate the above described advantages, with additional functionality and advantages being provided. A sensor, along with desirable modifications, is depicted in FIG. 25 and is further described below.

Figure 25:
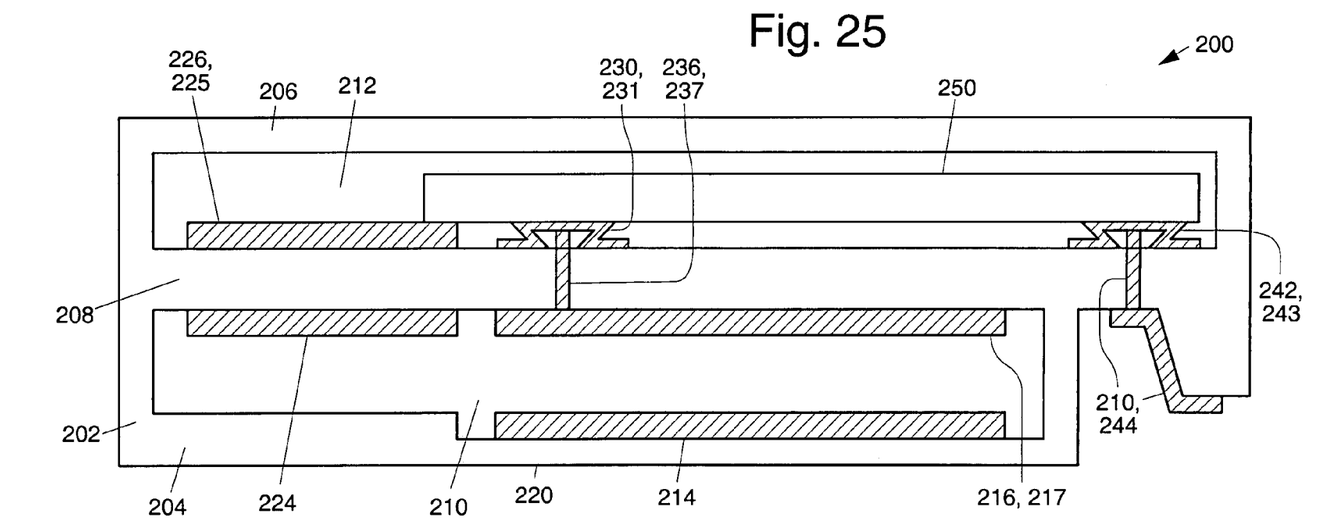
FIG. 25 is a schematic representation of a hermetic chamber with electrical feedthroughs according to a second embodiment.

FIG. 25 shows a sensor 200 comprising a sensor body 202 of fused silica or other suitable material, as discussed above. The sensor body 202 comprises a lower wall 204, an upper wall 206, and an intermediate wall 208. The intermediate wall 208 divides the hollow interior of the sensor body 202 into a lower hermetic chamber (pressure chamber) 210 and an upper chamber 212. A first electrode 214 is affixed within the lower hermetic chamber 210 to the lower sensor body wall 204. A second electrode 216 is affixed within the lower hermetic chamber 210 to the intermediate wall 208. A third electrode 217 is behind and in-plane with the second electrode 216 and is thus not visible in FIG. 25. The first plate 214 is thus arranged in parallel, spaced-apart relation with respect to the second and third electrodes 216, 217 so as to form a gap capacitor. A recess is formed in the lower sensor body wall 204 or the substrate comprising the lower sensor body wall is configured to be sufficiently thin to form a region 220 that will deflect in response to pressure changes. Because the first electrode 214 is coupled to the deflectable region 220, the distance between the first electrodes 214 changes with respect to the second and third electrodes 216, 217 with variations in external pressure. Thus the characteristic capacitance of a capacitor comprising the first, second, and third electrodes 214, 216, 217 changes with movement of the deflectable region 220.

Also mounted to the intermediate wall 208 within the lower hermetic chamber 210 is a fourth electrode 224. A fifth electrode 226 is located on the intermediate wall 208 within the upper chamber 212, which is, optionally, hermetic. A sixth electrode 225 is behind and in-plane with the fifth electrode 224 and is thus not visible in FIG. 25. The fourth electrode 224 is disposed in parallel, spaced apart relation with respect to the fifth and sixth electrodes 225, 226, separated by the thickness of the intermediate wall 208. Because the distance between the fourth electrode 224 and the fifth and sixth electrodes 225, 226 remains constant, a capacitive circuit comprising the fourth, fifth, and sixth electrodes provides a fixed reference. In the capacitor configuration described above, an example where the need for feedthroughs into the lower hermetic chamber 210 is eliminated, a configuration that sacrifices capacitance value for manufacturing considerations. Alternative configurations may be provided for, require either one or two feedthroughs into the lower hermetic chamber and should be clear to one skilled in the art.

Electrical contact pads 230 and 231 are formed on the intermediate wall 208 within the upper hermetic chamber. The electrical contact pads 230, 231, in this embodiment, are merely the feedthrough exterior formed on raised areas of the intermediate wall that surround the feedthrough passages formed through the intermediate wall as is described in the previous example. A first pad 230 is located opposite a portion of the second electrode 216. A second pad 231 is located opposite a portion of the third electrode 217 and is behind and in plane with the first pad 230 and thus not visible in FIG. 25. Electrical contact with the fifth and sixth electrodes 225, 226 is established by directly contacting the electrodes.

A first electrical feedthrough 236 places the first pad 230 and the second electrode 216 in communication through the intermediate wall 208. A second electrical feedthrough 237 places the second pad 231 and the third electrode 217 in communication through the intermediate wall 208. The electrical feedthroughs 236, 237 are filled with a conductive medium, such as metal. The second and third electrodes 216, 217 are optionally hermetically disposed against the openings of the electrical feedthroughs 236, 237. The pads 230, 231 are hermetically disposed on the ceramic substrate and the mechanical compressive seal created at the raised portions of the substrate surrounding electrical feedthroughs 230, 231 further reinforces this seal. At a minimum, this compressive and hermetic imposition of pads 230 and 231 renders the feedthrough hermetic. Optionally, electrodes 216, 217 and/or the medium filling the feedthroughs 236,237 further renders the feedthroughs hermetic.

To provide electrical access to the interior of the sensor, fifth and sixth electrical feedthrough 240, 241 are provided. The electrical feedthrough 240 extends from the exterior of the sensor body to the upper chamber 212. The electrical feedthrough 241 also extends from the exterior of the sensor body to the upper chamber 212 but is behind and in plane with the electrical feedthrough 240 and thus not visible in FIG. 25.

An electrical contact pad 242 (configured just as electrical contact pads 230 and 231) is located within the upper chamber 212 on the intermediate wall 208 and is disposed over the feedthrough 240. Likewise, an electrical contact pad 243 (configured just as electrical contact pads 230 and 231) is located within the upper chamber 212 on the intermediate wall 208 and is disposed over the feedthrough 241. The electrical contact pad 243 is behind and in plane with the electrical contact pad 242 and is therefore not visible in FIG. 25. Electrical contact pads 242, 243 are configured to provide a compressive, hermetic interface with the intermediate wall 208. The feedthroughs 240, 241 can be filled with a conductive material via any number of processes, e.g., LPPS, and electrical connection can be made on the exterior of the sensor body 202 as described in previous examples. Optionally, the hermeticity of the feedthrough is reinforced by the filling of the feedthroughs with a hermetic material and creating a hermetic interface between the substrate and the metal.

The upper chamber 212 contains one or more electrical components such as a silicon chip 250 bearing electronics that can act to buffer, to linearize, or otherwise to manipulate the electronic signal from the transducer. The silicon chip 250 is placed in electrical communication with the electrodes and with an external source by way of the conductive pads 230, 231, 242, and 243. In one embodiment (not shown), the electronics comprises an A/D converter placed in series with an additional silicon chip bearing electronics. In this case, an additional set of electrical contact pads are provided that allow electrical communication between the A/D converter and the additional electronics.

Fabrication of the sensor depicted in FIG. 25 is based on the micromachining of three substrates that are subsequently brought into contact and cut into individual sensors. The fabrication of the individual substrates as well as their final assembly is described as follows. The thin metal electrodes 216, 217 having overall, in-plane dimensions of 500 micrometers width, 3-4 mm length and 500 nm thickness, are formed within a recessed region of the same dimensions of the electrode that was previously etched into the surface of a first substrate using photolithography and chemical etching as described for previous examples. The metal electrodes are shorter than the depth of the recessed region by 200 rim. A second substrate has a second recessed region formed therein having a depth of 700 nm and the same cross-sectional dimensions as the recessed region in the upper wafer. A thin metal electrode 214, having a thickness of 500 nm and the same overall, in-plane dimensions as electrodes 216 and 217, is then formed into this recessed region. The electrode 214 is thinner than the depth of the recessed region by 200 nm. When the first and second substrates are bonded together with their respective recessed regions facing each other, a gap of 400 nm is thereby formed between the electrode 214 and the electrodes 216 and 217. Feedthroughs 236, 237 are then created from the top surface of the second substrate down to the upper electrodes 216 and 217, using laser rastering and HF etching. Conductive pads 230, 231, 242, and 243 on the top surface of the second substrate can be formed during the feedthrough fabrication sequence. The silicon chip 250 is then connected to the conductive pads 230, 231, 242, and 243 that were formed during the feedthrough fabrication sequence. A third substrate that has a recess sufficiently deep to contain the silicon chip 250 and to make contact to the second substrate is added to the assembly. A laser is then used to remove material around the sensor periphery to reduce the sensor to final dimensions. In the disclosed embodiment, the sensor is 750 micrometers wide by 45 mm long and 0.6 mm tall. Feedthroughs 240 and 241 are then created to allow for conductive communication with external electronics.

Figure 26:
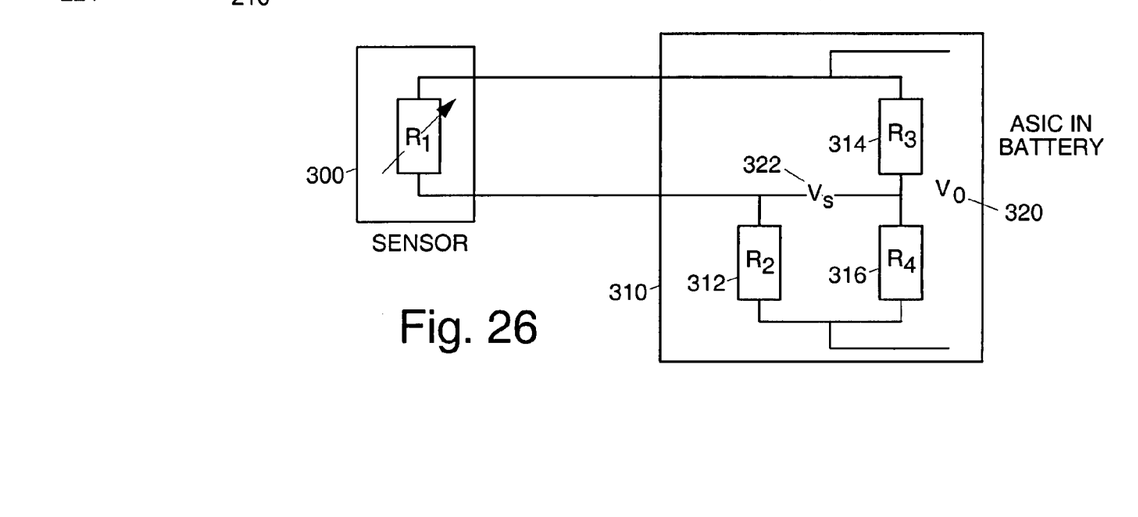
FIG. 26 is an electrical schematic of a piezoresistive transduction scheme for measuring changes in the position of the deflectable region in the pressure cavity of the hermetic chambers shown in FIGS. 6 and 25.

In an alternative example shown in FIG. 26, a piezoresistive transduction scheme can be utilized to measure changes in the position of the deflectable region in the pressure cavity. One or more piezoresistive elements translate mechanical strain into changes in electrical resistance. The piezoresistor is made of, e.g., polysilicon and formed on the interior of the pressure cavity in lieu of the electrodes in previous examples. The resistance modulation is, e.g., detected through a fully active Wheatstone bridge, as is known in the art. Optimally, the Wheatstone bridge configuration used is one where only one leg of the bridge is fixed to the deflectable region of the pressure cavity. This design reduces the number of feedthroughs to two.

It is also a feature that the compressive feedthroughs be located on the interior surface of the pressure cavity. Metal electrodes could, e.g., be disposed over the raised portions. Also, in the second chamber (containing the on-board electronics), the feedthroughs between the on-board electronics and the sensor exterior can be configured in any number of ways and in any number of locations, and such geometries should be clear to one skilled in the art and in light of a final desired use of the disclosed sensors. The examples disclosed herein are not intended to limit the invention in any way, as a myriad of particular configurations are possible and obvious to one skilled in the art, but to illustrate one such possible configuration.

Sensors are configured to be biased by external electronics under either alternating or direct current if refractory metals are used to construct the feedthroughs. If any other metals are used, the sensors should be biased under DC power.

While the micromachinable, hermetic, pressure cavities and sensors as been illustrated in the context of a biological device, it will be appreciated that the hermetic chamber herein described can be adapted to non-biological applications, for example, industrial applications in which a harsh environment is encountered.

Thus, micromachinable, hermetic, pico to nanoliter-volume pressure cavities and sensors have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. A device comprising:
   a substrate having first and second sides;
   a passage through the substrate from the first side to the second side;
   a raised portion of the substrate located on the first side, surrounding the passage and having an outer surface which forms an angle that is less than 90 degrees relative to a plane defined by the surface of the first side and extending away from a center line of the passage; and
   a metal layer disposed against the first side of the substrate over the passage; and
   wherein a compressive force is exerted on the raised portion that surrounds the passage on the first side of the substrate.

2. The device of claim 1, wherein the metal layer is hermetically disposed against the first side of the substrate.

3. The device of claim 1, further comprising a conductive material located within the passage and in electrical contact with the metal layer, and conductive material disposed on the second side of the substrate that is in electrical contact with the conductive material located within the passage, whereby an electrical device on the first side of the substrate coupled to the metal layer is placed in electrical communication with the conductive material on the second side of the substrate through the conductive material within the passage and the metal layer.

4. The device of claim 3, wherein the conductive material located within the passage, the conductive material on the second side of the substrate, and the metal layer disposed against the first side of the substrate over the passage form a hermetic electrical feedthrough establishing electrical communication with a cavity in the substrate.

5. A device comprising:
   a housing having walls defining a chamber, a first one of the walls defining an exterior wall of the housing;
   a passage through the exterior wall from a first side to a second side;
   a raised portion of the exterior wall located on the first side of the exterior wall, surrounding the passage and having an outer surface which forms an angle that is less than 90 degrees relative to a plane defined by a surface of the first side and extending away from a center line of the passage; and
   a metal layer disposed against the first side of the exterior wall and outer surface of the passage;
   wherein a compressive force is exerted on the raised portion that surrounds the passage on the first side of the exterior wall; and
   whereby an external electrical device coupled to the metal layer is placed in electrical communication with an interior of the chamber through the passage.

6. The device of claim 5, wherein the housing further comprises a unitary housing.

7. The device of claim 5, wherein the housing is comprised of glass, fused silica, sapphire, quartz or silicon.

8. The device of claim 5, wherein the passage comprises a first passage, and wherein the device further comprises:
   a second passage through the first one of the walls defining the chamber; and
   a second electrode hermetically disposed over the second passage within the chamber, whereby the second passage is hermetically sealed;
   whereby the chamber is hermetically sealed; and
   whereby a second external electrical device is placed in electrical communication with the second electrode through the second passage.

9. The device of claim 8, wherein a second one of the walls defining the chamber and opposite the first wall comprises an exterior wall of the housing;
   wherein the second one of the walls defining the chamber comprises a deflectable region;
   wherein a third electrode is deposited on the second one of the walls within the chamber in the deflectable region; and
   wherein the third electrode is placed in electrical communication with one of the first electrode or the second electrode.

10. The device of claim 8, wherein a third electrode is deposited on an interior wall of the chamber opposite to the first wall;
    wherein the first, second, and third electrodes are electrically isolated from one another; and
    wherein the interior wall of the chamber opposite to the first wall further comprises a deflectable region.

11. The device of claim 5, wherein the passage is completely filled with an electrically conductive material, whereby the external electrical device is placed in electrical communication with the interior of the chamber by electrically connecting the electrical device to the electrically conductive material.

* * * * *